United States Patent
Drugge et al.

(10) Patent No.: US 8,675,879 B2
(45) Date of Patent: Mar. 18, 2014

(54) METHODS AND DEVICES FOR ALLOCATING SCRAMBLING CODES

(75) Inventors: Oskar Drugge, Malmo (SE); Douglas A. Cairns, Durham, NC (US); Muhammad Kazmi, Bromma (SE); Andres Reial, Malmo (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/500,590

(22) PCT Filed: Nov. 3, 2010

(86) PCT No.: PCT/SE2010/051193
§ 371 (c)(1),
(2), (4) Date: Apr. 5, 2012

(87) PCT Pub. No.: WO2011/059379
PCT Pub. Date: May 19, 2011

(65) Prior Publication Data
US 2012/0219155 A1     Aug. 30, 2012

Related U.S. Application Data

(60) Provisional application No. 61/260,211, filed on Nov. 11, 2009, provisional application No. 61/259,872, filed on Nov. 10, 2009.

(51) Int. Cl.
*H04K 1/00* (2006.01)

(52) U.S. Cl.
USPC .......................................... 380/287; 713/190

(58) Field of Classification Search
USPC ....................................................... 380/287
See application file for complete search history.

(56) References Cited

U.S. PATENT DOCUMENTS

| | | | |
|---|---|---|---|
| 8,160,590 B2 * | 4/2012 | Mueck et al. ................. | 455/444 |
| 2006/0274712 A1 * | 12/2006 | Malladi et al. ................ | 370/345 |
| 2009/0122839 A1 * | 5/2009 | Luo et al. ...................... | 375/145 |
| 2009/0219910 A1 * | 9/2009 | Han et al. ...................... | 370/343 |
| 2010/0069119 A1 * | 3/2010 | Mueck et al. ................. | 455/561 |
| 2011/0090817 A1 | 4/2011 | Qu et al. | |

FOREIGN PATENT DOCUMENTS

| | | |
|---|---|---|
| EP | 1 875 692 A2 | 1/2008 |
| WO | WO 2009/082173 A2 | 7/2009 |
| WO | WO 2009/155859 A1 | 12/2009 |

OTHER PUBLICATIONS

Erik Dahlman; UMTS/IMT-2000 Based on Wideband CDMA; Year: 2004; IEEE; pp. 1-11.*
International Search Report, PCT Application No. PCT/SE2010/051193, Jun. 8, 2011, 5 pages.

(Continued)

*Primary Examiner* — Mohammad W Reza
*Assistant Examiner* — Monjour Rahim
(74) *Attorney, Agent, or Firm* — Myers Bigel Sibley & Sajovec PA

(57) ABSTRACT

A method of operating a User Equipment (UE) for generating a second scrambling code group where the UE is configured for receiving downlink transmission from a Universal Mobile Telecommunications System Terrestrial Radio Access Network (UTRAN) on a set of at least two downlink carriers including an anchor carrier and at least a first secondary carrier includes: determining a first scrambling code group associated with a first cell on the anchor carrier and deriving the second scrambling code group associated with a second cell on said first secondary carrier using a predefined rule defining the relation between the second scrambling code group and the first scrambling code group.

12 Claims, 5 Drawing Sheets

(56) References Cited

OTHER PUBLICATIONS

Notification of Transmittal of the International Preliminary Report on Patentability, PCT Application No. PCT/SE2010/051193, Mar. 8, 2012, 21 pages.

Qualcomm Europe: "Searcher Impact to DC-HSDPA Type 3i UEs when SCH is absent on secondary carrier", 3GPP Draft; R4-092283_Searcher_Impact_DC_HSDPA_Type3i, $3^{rd}$ Generation Partnership Project (3GPP), Mobile Competence Centre; 650, Route Des Lucioles; F-06921 Sophia-Antipolis Cedex; France, No. Los Angeles, CA; Jun. 25, 2009 XP050353527.

* cited by examiner

METHODS AND DEVICES FOR ALLOCATING SCRAMBLING CODES

CROSS REFERENCE TO RELATED APPLICATIONS

This application is a 35 U.S.C. §371 national stage application of PCT International Application No. PCT/SE2010/051193, filed on 3 Nov. 2010, which claims priority to U.S. provisional Patent Application No. 61/260,211, filed 11 Nov. 2009, which itself claims priority to U.S. provisional Patent Application No. 61/259,872, filed 10 Nov. 2009, the disclosure and content of all of which are incorporated by reference herein in their entirety. The above-referenced PCT International Application was published in the English language as International Publication No. WO 2011/059379 A2 on 19 May 2011.

TECHNICAL FIELD

The present invention relates to methods and devices for allocating scrambling codes. In particular the invention relates to methods and devices for allocating scrambling codes for a cellular radio system operated with multiple carriers.

BACKGROUND

Multicarrier Principles

A multi carrier (MC) arrangement with frequency division duplex (FDD) can be described as a set of downlink carriers linked to a set of uplink carriers. The downlink carriers can be adjacent or non-adjacent in the frequency domain, and the same holds for the uplink carriers. Multi-carrier arrangements can also be used in time division duplex (TDD) systems. The component carriers in a multi-carrier system may also belong to different frequency bands. The primary objective of the multi-carrier system is to achieve higher data rates in the downlink or in the uplink or in both directions.

Operation of Wideband Code Division Multiple Access/High Speed Packet Access (WCDMA/HSPA) on multiple of 5 MHz carrier frequencies is in fact an evolution of WCDMA and HSPA. This mode of operation is often referred to as Multi Carrier WCDMA or Multi Carrier HSPA. Similar evolution is taking place in Evolved Universal Mobile Telecommunications System Terrestrial Radio Access Network (E-UTRAN) system, where multiple component carriers (e.g. 4×20 MHz in DL and 2×20 MHz in UL for FDD) shall be used to enhance the data rate.

Generally, in multi-carrier systems more than one carrier is used at least in the downlink or the uplink. One of the multi carriers is called anchor carrier (a.k.a. primary carrier) and remaining ones are called secondary carriers (a.k.a. supplementary carriers).

The anchor carrier (alternatively referred to as primary carrier) contains all types of physical channels including all common control channels. The secondary carriers may or may not contain all types of physical channels; for instance they may lack some of the common downlink control channels. The anchor carrier in downlink and in uplink (i.e. if there is more than one carrier in uplink) should work according to the legacy operation. Note that legacy operation is based on a single carrier. This means that the downlink anchor carrier should contain all common channels. This is to make sure that firstly the legacy single-carrier capable User Equipments (UEs) are served. Secondly also the multi-carrier UE requires that at least the anchor carrier transmits all common control channels for acquisition of the frame timing, neighbor cell measurements etc.

In short, the downlink anchor carrier of a multi-carrier system includes the same types of physical channels as the downlink carrier in a single carrier system, while a secondary downlink carrier of the multi-carrier system may be missing some of the types of channels which are included in the anchor carrier.

For instance a UE in dual cell High Speed Downlink Packet Access, HSDPA, (DC-HSDPA) operation, which is specified in release 8, is able to simultaneously receive HSDPA traffic over two downlink carrier frequencies, see third generation partnership project technical specification 3GPP TS 25.214, "Physical layer procedures (FDD)".

They are also transmitted in the same frequency band from a single serving sector. There is one uplink carrier for a DC-HSDPA UE and it is not strictly tied to one of the two downlink carriers. In DC-HSDPA UE, the anchor carrier has all types of physical channels including Fractional Dedicated Physical Channel (F-DPCH), E-DCH HARQ Acknowledgement Indicator Channel (E-HICH), Enhanced Absolute Grant Channel (E-AGCH), and E-DCH Relative Grant Channel (E-RGCH). During dual carrier operation in CELL_DCH, one of the downlink carriers is the UE secondary carrier, which is not the UE anchor carrier, see third generation partnership project technical specification 3GPP TS 25.214, "Physical layer procedures (FDD)".

Any system can be evolved to a multi-carrier system since it leads to many-fold increase in data rate. The future advancements of HSPA, E-UTRAN and other systems would culminate into a multi-carrier system with multiple carriers both in uplink and downlink (e.g. 4 downlink carriers and 2 uplink carriers). There is also an ongoing work to introduce dual carrier for uplink under the work item called dual cell HSUPA. In case of dual cell HSUPA operation, there are at least 2 downlink carriers.

UE Advanced Receiver Capabilities

In release 5 the UE receiver performance requirements are solely based on the baseline classical rake receiver. The corresponding requirements are commonly termed and specified as the minimum performance requirements in third generation partnership project technical specification 3GPP TS 25.101, "User Equipment (UE) radio transmission and reception (FDD)".

In release 6 and beyond, enhanced UE receiver performance requirements are also specified in 3GPP TS 25.101, "User Equipment (UE) radio transmission and reception (FDD)". In order to fulfill these requirements and pass the corresponding conformance tests, the UE will have to implement an advanced receiver e.g. receiver diversity, chip level equalizer, generalized rake receivers (G-RAKE) or similar receiver structures. A goal of the specification of the enhanced requirements is to significantly boost the downlink bit rate. In WCDMA terminology UE receiver performance requirements for various advanced receivers are specified as enhanced receiver type 1 (receiver diversity), enhanced receiver type 2 (chip level equalizer), enhanced receiver type 3 (combined receiver diversity and equalizer) and type 3i (combined receiver diversity and inter-cell interference cancellation receiver) until now. Furthermore the enhanced receiver performance specification does not preclude the UE vendors to implement advanced receivers beyond the specified enhanced requirements.

It should be noted that enhanced performance requirements are not only confined to HSDPA. In fact enhanced requirements are prevalent for a number of reception scenarios where the UE receives downlink transmissions from a Universal Terrestrial Radio Access Network (UTRAN): Dedicated Channel (DCH), Multimedia Broadcast and Multicast Service (MBMS), Enhanced Dedicated Channel (E-DCH) downlink channels etc. However, in the present description the focus is on HSDPA reception scenario and more specifically on the multi-carrier HSDPA reception scenario.

For Long Term Evolution (LTE), where a UE receives downlink transmissions from an E-UTRAN, options for interference cancellation can also be envisioned, some of which requires that the UE can synchronize and process the reference signal in order to characterize the interference. The teachings of the instant description can also be applied for this case.

Interference Cancellation Ability of Receivers

Different types of receivers lead to different levels of performance gain. The performance gain is achieved by eliminating or at least mitigating different types of interference. There are various sources and forms of interference e.g. intra-cell, inter-cell, inter-stream interferences etc. For instance in a Code Division Multiple Access (CDMA) system, such as in WCDMA, the intra-cell interference is common due to a loss of orthogonality between the channelization codes as these pass through a multipath fading channel.

On the other hand, the inter-cell interference exists in single or tight reuse systems such as in CDMA and Orthogonal Frequency-Division Multiple Access (OFDMA) based LTE system. The source of inter-cell interference is the interference from a certain number of neighbor cells.

Multiple Input Multiple Output (MIMO) transmission comprises of two ore more streams of data. MIMO provides system improvement at high Signal to Interference-plus-Noise Ratio (SINR). But the multi-stream transmission also leads to inter-stream interference, which could be eliminated or considerably reduced by using an appropriate receiver.

The enhanced receiver type 3 (a.k.a G-RAKE 2 receiver in the symbol-level implementation) is capable of eliminating intra-cell interference leading to significant performance gain over the classical rake receiver. Similarly the enhanced receiver type 3i (a.k.a G-RAKE 2+ receiver in the symbol-level implementation) is capable of eliminating both intra-cell and inter-cell interferences leading to significant performance gain over the classical rake receiver. There are several different ways to implement the type 3i receiver functionality, where two of the methods can be called parametric and non parametric solutions. The non-parametric solution estimates the net interference effect, bundling all intra- and inter-cell interference sources into one package, and tries to reduce them simultaneously. The parametric solution on the other hand attempts to explicitly model the interference as a sum of its different contributing parts. The parametric solution needs to be capable of detecting a certain number of interfering cells to suppress (ideally the strongest interfering cells). For instance the UE should identify the scrambling codes used in the strongest interfering cells and eventually use this information to eliminate or minimize the interference. The UE further needs to continuously estimate the channel response of the interfering cell(s) in order to suppress the interference. Estimating the channel response can be done in several ways, where one way is to separately estimate the power delay profile and use it to determine the channel tap delays, and separately estimate the complex weight for each of the tap delays.

It should be noted that although the discussion on interference canceling receivers so far has been limited to the by 3GPP specified Type 3i (Parametric) receiver for WCDMA/HSPA, the knowledge of the channel responses from interfering cells could be used in many other receiver structures. Examples of other receivers could e.g. be receivers that attempt to create a replica of the received interfering signal and subtract it from the desired signal, and can also include OFDMA receivers that characterizes and mitigates the effect of neighbor cell interference.

UE Implementation Aspects

In WCDMA/HSPA, the downlink common control channels include primary synchronization channel (P-SCH), which carries primary synchronization code (PSC), secondary synchronization channel (S-SCH), which carries secondary synchronization code (SSC), primary Common Pilot Channel (CPICH), which carriers scrambling code information and broadcast channel (BCH), which carriers system information comprising of master information block (MIB) and system information blocks (SIB). The P-SCH and S-SCH together are known as SCH channel.

There are in total 8192 scrambling codes available for the system to use. This set is divided into 64 primary scrambling code groups, each containing 8 primary scrambling codes. Each primary scrambling code is associated to 15 secondary scrambling codes through a one to one mapping. The UE is not required to search for secondary scrambling codes during the initial synchronization procedure.

In a typical UE implementation, the identification of slot/frame boundary, and identification of scrambling code for the serving cell is done through a phased approach, as described below:

Stage 1: Find the slot boundary using the P-SCH

Stage 2: Find the frame boundary and the scrambling code group using P-SCH and S-SCH, where each scrambling code group contains 8 primary scrambling codes.

Stage 3: Using CPICH, determine the best primary scrambling code candidate out of the 8 contained in the scrambling code group identified in Stage 2.

In multi-carrier systems the downlink anchor carrier contains all the common channels. However, depending upon the network implementation, some of the common control channels may not be transmitted on the secondary carriers; it might for example be the case that only the CPICH is transmitted on the secondary carrier. The absence of SCH channels on the secondary carrier would increase the complexity of the inter-cell interference cancellation receiver, because the UE is unable to make use of the S-SCH to identify the scrambling code group.

For LTE, there are 504 physical-layer cell identities. The physical-layer cell identities are grouped into 168 unique physical-layer cell-identity groups, each group containing three unique identities. The grouping is such that each physical-layer cell identity is part of one and only one physical-layer cell-identity group. A physical-layer cell identity is thus uniquely defined by a number in the range of 0 to 167, representing the physical-layer cell-identity group, and a number in the range of 0 to 2, representing the physical-layer identity within the physical-layer cell-identity group, see the technical specification 3GPP TS 36.213, "Physical layer procedures", v 8.8.0.

Similar to WCDMA/HSPA, the LTE downlink common control channels include among others the SCH channel, which carries the primary and secondary synchronization code. The primary synchronization code carries information about the physical-layer cell-identity group, while the secondary synchronization code carries information about which of the physical-layer cell identities in the physical-layer cell-identity group that is used. Using the physical-layer cell identity, the UE can derive the exact definition of the cell specific reference signals.

Similar to WCDMA/HSPA, the SCH channel is required for the UE to identify the slot and sub-frame timing. Additionally, the SCH is in LTE systems used to obtain frequency synchronization.

In contrast to the WCDMA/HSPA cell search procedure, the LTE cell-search procedure does not include a stage 3 cell search, instead it determines, slot and subframe timing, frequency synchronization and cell-identity group using the SCH only.

In order for the UE receiver to cancel the inter-cell interference, which is caused by the neighbor cells, the channel impulse responses from each of the interfering cells are to be determined. In order to be able to do this, the UE needs to have knowledge about the timing of the neighbor cells and the scrambling codes used in those neighbor cells.

In a multi-carrier system, it is up to the network implementation whether to implement all the control channels on all the secondary carriers or not. In the absence of synchronization signals on secondary carriers, the UE will have to perform extensive search to determine the scrambling codes used in the neighbor cells. This will drain UE power and slow down the synchronization process. One way to mitigate search complexity is to signal a list of scrambling codes used by the neighbor cells on their secondary carriers. However this solution comes with the cost of a significant network overhead, that is undesirable and should be avoided or mitigated.

Furthermore, it should be noted that the book-keeping of neighbour cell lists in general is a difficult and error-prone task. There is thus a need for eliminating the risk for configuring the detailed neighbour cell list incorrectly. An incorrectly configured neighbour cell list, could lead to the UE not being able to identify the strongest interfering cells correctly.

Hence there exist a need for new methods and devices providing improved configuration of cellular radio systems operated using multiple carriers.

SUMMARY

It is an object of the present invention to provide an improved set of methods and devices to address the problems as outlined above.

This object and others are obtained by the methods and devices as set out in the appended claims.

Thus, in accordance with embodiments of the invention methods and devices are provided whereby scrambling codes can be set in an improved way.

In accordance with one embodiment a method is provided in a User Equipment for generating a second scrambling code or a second scrambling code group. The UE is configured for multi carrier operation receiving downlink transmission from a Universal Mobile Telecommunications System Terrestrial Radio Access Network on a set of at least two downlink carriers including an anchor carrier and at least a first secondary carrier. The method comprises determining a first scrambling code or a first scrambling code group associated with a first cell on the anchor carrier; and deriving a second scrambling code or a second scrambling code group associated with a second cell on said first secondary carrier using a predefined rule defining the relation between the second scrambling code or second scrambling code group and the first scrambling code or scrambling code group. Hereby interference suppression/cancellation processing is enabled in a receiver of a UE on secondary cells in multi-carrier scenarios that do not transmit the SCH, while minimizing the need for overhead in terms of signaling of the scrambling codes for neighbouring cells in a UTRAN system.

In accordance with one embodiment according to the predefined rule, the first and the second cells are associated with the same scrambling code, such that the first and the second scrambling codes are identical.

In accordance with one embodiment according to the predefined rule, the first and the second cells are associated with the same scrambling code group, such that the first and the second scrambling code groups are identical.

In accordance with one embodiment according to the predefined rule, a predefined function defines the relation between the first scrambling code or scrambling code group and the second scrambling code or scrambling code group.

In accordance with one embodiment the predefined function includes one or more parameters which the UE receives from the UTRAN.

In accordance with one embodiment the one or more parameters include(s) a fixed offset between the first scrambling code and the second scrambling code or between the first scrambling code group and the second scrambling code group.

In accordance with one embodiment the step of determining the first scrambling code or the first scrambling code group comprises: finding a slot boundary using a Primary synchronization channel, SCH, transmitted on the anchor carrier; and finding a frame boundary and the first scrambling code group using the Primary SCH and a Secondary SCH transmitted on the anchor carrier.

In accordance with one embodiment the first scrambling code is determined based on the first scrambling code group and a Common Pilot Channel, transmitted on the anchor carrier.

In accordance with one embodiment neither the Primary SCH nor the Secondary SCH are transmitted for the second cell on the first secondary carrier.

In accordance with one embodiment the UE is configured as having a first serving cell on the anchor carrier and a second serving cell on the first secondary carrier for reception of data from the UTRAN, and wherein the first cell is a neighbor cell to the first serving cell on the anchor carrier and the second cell is a neighbor cell to the second serving cell on the first secondary carrier.

In accordance with one embodiment the derived second scrambling code or second scrambling code group is used by the UE for performing inter-cell interference cancellation of interference received from the second cell.

In accordance with one embodiment a method in a User Equipment for generating a second physical-layer cell identity or physical-layer cell identity group is provided. The UE is configured for multi carrier operation receiving downlink transmission from an Evolved Universal Mobile Telecommunications System Terrestrial Radio Access Network on a set of at least two downlink carriers including a primary carrier and at least a first secondary carrier. The method comprises determining a first physical-layer cell identity or physical-layer cell identity group associated with a first cell on the primary carrier; and deriving a second physical-layer cell identity or physical-layer cell identity group associated with a second cell on the first secondary carrier using a predefined rule defining the relation between the second physical-layer cell identity or physical-layer cell identity group and the first physical-layer cell identity or physical-layer cell identity group. Hereby interference suppression/cancellation processing is enabled in a receiver of a UE on secondary cells in multi-carrier scenarios that do not transmit the SCH, while minimizing the need for overhead in terms of signaling of the scrambling codes for neighbouring cells in an E-UTRAN system.

In accordance with one embodiment according to the predefined rule, the first and the second cells are associated with the same physical-layer cell identity, such that the first and the second physical-layer cell identities are identical.

In accordance with one embodiment according to the predefined rule, the first and the second cells are associated with the same physical-layer cell identity group, such that the first and the second physical-layer cell identity groups are identical.

In accordance with one embodiment according to the predefined rule, a predefined function defines the relation between the first physical-layer cell identity or physical-layer cell identity group and the second physical-layer cell identity or physical-layer cell identity group.

In accordance with one embodiment the predefined function includes one or more parameters which the UE receives from the E-UTRAN.

In accordance with one embodiment the one or more parameters include(s) a fixed offset between the first physical-layer cell identity and the second physical-layer cell identity or between the first physical-layer cell identity group and the second physical-layer cell identity group.

By restricting or defining the network configuration options such that a certain association between the scrambling code used on the primary carrier and the scrambling code used on the secondary carriers is maintained, either according to a pre-defined relation defined in advance or by signaling it to the UE, it is possible to improve the interference suppression/cancellation processing.

This is possible because a UE can use a-priori information to eliminate the steps in the synchronization procedure that requires synchronization channel (SCH) to be transmitted on the secondary carriers. This information (association) will enable UE to acquire information about the scrambling code used on cells on secondary carriers. The information may assist the UE in eliminating the inter-cell interference when using interference cancellation receiver.

The teachings can be applied to any downlink multi-carrier systems comprising 2 or more downlink carriers e.g. DC-HSDPA, MC-HSDPA or multicarrier LTE. In dual carrier system there will be only one secondary carrier. Secondary carrier is a.k.a. a supplementary or component carrier.

The invention also extends to User Equipments and a network node, such as a radio base station Node B, arranged to perform allocation of scrambling codes in accordance with the above methods. To enable the allocation of scrambling codes the User Equipment and radio base station Node B can be provided with a controller/controller circuitry for performing the above methods. The controller(s) can be implemented using suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor or may include, without limitation, digital signal processor (DSP) hardware, ASIC hardware, read only memory (ROM), random access memory (RAM), and/or other storage media.

BRIEF DESCRIPTION OF THE DRAWINGS

The present invention will now be described in more detail by way of non-limiting examples and with reference to the accompanying drawing, in which.

DETAILED DESCRIPTION

Figure 1:
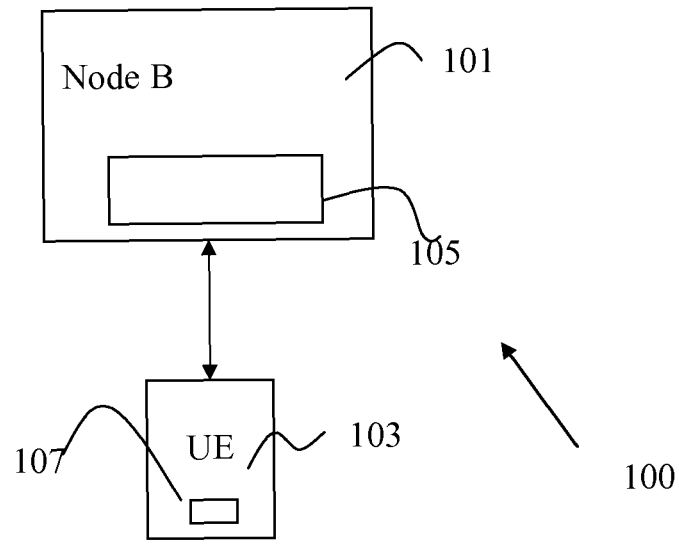
FIG. 1 is a view of a cellular radio system.

In FIG. 1 a general view of a cellular radio system 100 is depicted. The system 100 depicted in FIG. 1 is a UTRAN system. However it is also envisaged that the system can be an E-UTRAN system or another similar systems. The system 100 comprises a number of base stations 101, whereof only one is shown for reasons of simplicity. The base station 101 can be connected to user equipments, in the figure represented by the UE 103 located in the area served by the base station 101. The system 100 is further configured for multi carrier operation in at least the down link. The multi carrier operation comprises an anchor (primary) carrier and at least one secondary carrier. The base station and the user equipment further comprise controllers/controller circuitry 105 and 107 for providing functionality associated with the respective entities. The controllers 105 and 107 can for example comprise suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor may include, without limitation, digital signal processor (DSP) hardware, ASIC hardware, read only memory (ROM), random access memory (RAM), and/or other storage media.

Figure 2:
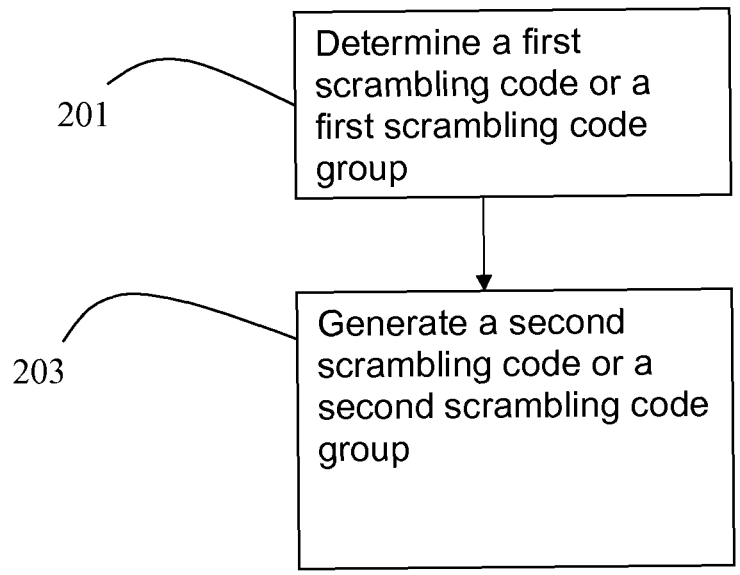
FIGS. 2-6 are flow charts depicting different steps performed when generating scrambling codes.

In FIG. 2 some procedural steps performed when generating a second scrambling code or a second scrambling code group are depicted. First, in a step 201, a first scrambling code or a first scrambling code group associated with a first cell on the anchor carrier is determined. Thereupon, in a step 203, a second scrambling code or a second scrambling code group associated with a second cell on said first secondary carrier is generated using a predefined rule defining the relation between the second scrambling code or second scrambling code group and the first scrambling code or scrambling code group.

Figure 3:
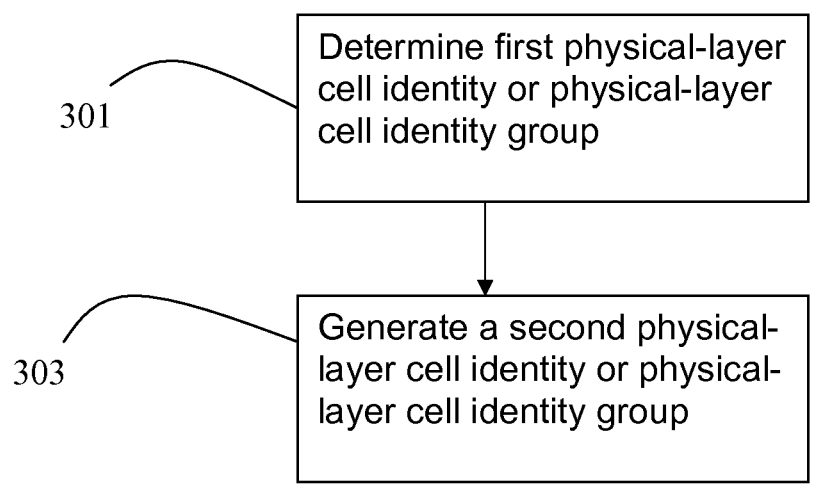

In FIG. 3 some procedural steps performed when generating a second physical-layer cell identity or physical-layer cell identity group are depicted. First, in a step 301, a first physical-layer cell identity or physical-layer cell identity group associated with a first cell on the primary carrier is determined. Thereupon, in a step 303 a second physical-layer cell identity or physical-layer cell identity group associated with a second cell on the first secondary carrier is generated using a predefined rule defining the relation between the second physical-layer cell identity or physical-layer cell identity group and the first physical-layer cell identity or physical-layer cell identity group.

When generating a second scrambling code or a second scrambling code group different methods can be used. Below some more detailed exemplary embodiments are described.

In accordance with one embodiment a pre-defined rule using the same scrambling code (or physical-layer cell identity) on primary and secondary carriers is employed.

For WCDMA this can include mandating the use of the same scrambling code on primary and secondary carriers. This rule can be pre-defined, i.e. specified in the standard. The corresponding UE behavior is that the UE shall assume same scrambling code on primary and secondary carriers. Together with the knowledge of the timing of the corresponding primary carrier, this information can be used by the UE to cancel inter-cell interference when using interference cancellation receiver e.g. Enhanced Receiver Type 3i used in DC-HSDPA or multi-carrier HSDPA.

For LTE this can include mandating the use of the same physical-layer cell identity and frequency synchronization on primary and secondary carriers. This rule can be pre-defined i.e. specified in the standard. The corresponding UE behavior that UE shall assume same physical-layer cell identity on primary and secondary carriers is used. Together with the knowledge of the timing and frequency synchronization for the corresponding primary carrier, this information can be used by the UE to cancel inter-cell interference when using interference cancellation receiver.

In accordance with one embodiment a pre-defined rule comprises same scrambling code group (or physical-layer cell-identity group) on primary and secondary carriers. For WCDMA this can include mandating the use of the same scrambling code group on primary and secondary carrier. This rule can also be pre-defined i.e. specified in the standard. The corresponding UE behavior that UE shall assume same scrambling code group on primary and secondary carriers is used. Together with the knowledge of the timing of the corresponding primary carrier, this information can be used by the UE to cancel inter-cell interference when using interference cancellation receiver e.g. Enhanced Receiver Type 3i used in DC-HSDPA or multi-carrier HSDPA.

For LTE this can include mandating the use of the same physical-layer cell-identity group and frequency synchronization on primary and secondary carrier. This rule can also be pre-defined i.e. specified in the standard. The corresponding UE behavior that UE shall assume same physical-layer cell-identity group on primary and secondary carriers is used. Together with the knowledge of the timing and frequency synchronization, this information can be used by the UE to cancel inter-cell interference when using interference cancellation receiver.

In accordance with one embodiment a pre-defined rule comprises mapping between scrambling code (WCDMA), scrambling code group (WCDMA), physical-layer cell identity (LTE) or physical-layer cell identity group (LTE).

WCDMA

For WCDMA a known mapping is introduced that defines a relation between the scrambling code, or scrambling code groups, used on primary and secondary carrier. Different options exist for relating the scrambling codes, or relating the scrambling code groups.

In accordance with one option, a mapping between scrambling codes is defined. The mapping can be done through any functional relation, and is not limited to being one to one, but could also be done in a one-to-many fashion. The mapping can either be made known to the UE through mandating it in the standard, or through an optional or mandatory signaling of parameter(s) that determines the exact properties of the mapping. An embodiment according to this option can be implemented using a device whereby the scrambling code for the cell transmitting on the secondary frequencies/carriers is related to the scrambling code of the primary carrier by a fixed offset (or another functional relation as elaborated below). The offset (or another parameter defining the functional relation) may optionally be signaled to the UE. Assuming that the signaling occurs on a periodical basis, the UE would, in case the information entity containing the offset was optionally left out, use the stored value from the last point of receiving the information entity.

Figure 4:
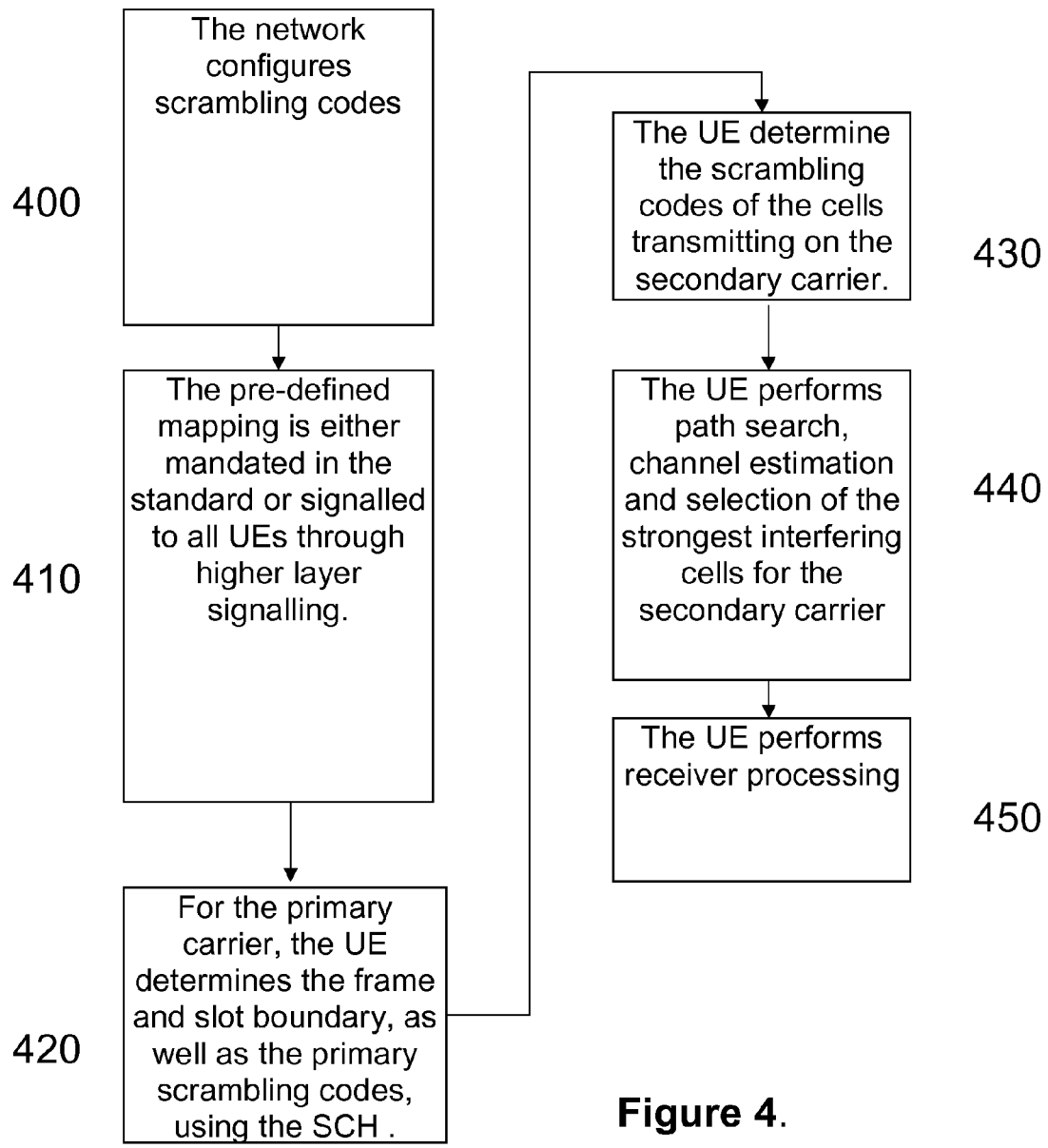

A flow chart of an embodiment according to this option is shown in FIG. 4 assuming that higher-layer signalling is used. First in a step 400, the network configures scrambling codes with a mapping that relates the scrambling code on the primary carrier to the scrambling code on the secondary carrier through a fixed offset or another functional relation. The configuration/allocation of scrambling codes in the network can be performed in a suitable node of the network such as the radio base station NodeB. Next, in a step 410, the pre-defined mapping is either mandated in the standard or signalled to all UEs through higher layer signalling. Assuming that the information can be optionally signaled at periodically occuring signaling occasions, the UE re-uses the last signaled value in case the information entity was temporarily left out. Then in a step 420, for the primary carrier, the UE determines the frame and slot boundary, as well as the primary scrambling codes, using the SCH. Next in a step 430 The UE makes use of the standarized or signaled relation to determine the scrambling codes of the cells transmitting on the secondary carrier. Then, in a step 440, The UE performs path search, channel estimation and selection of the strongest interfering cells for the secondary carrier utilizing knowledge of the scrambling codes for cells on the secondary carrier. Thereupon, in a step 450, the UE performs receiver processing according to the Type 3i method or another neighbor-cell interference mitigation algorithm.

In accordance with one embodiment, a mapping between scrambling code groups can be defined. The mapping can be done through any functional relation, and is not limited to being one-to-one, but could also be done in a one-to-many fashion or relation. The mapping could either be made known to the UE through mandating it in the standard (i.e. pre-defined mapping), or through an optional or mandatory signaling of parameter(s) that determines the exact properties of the mapping.

Figure 5:
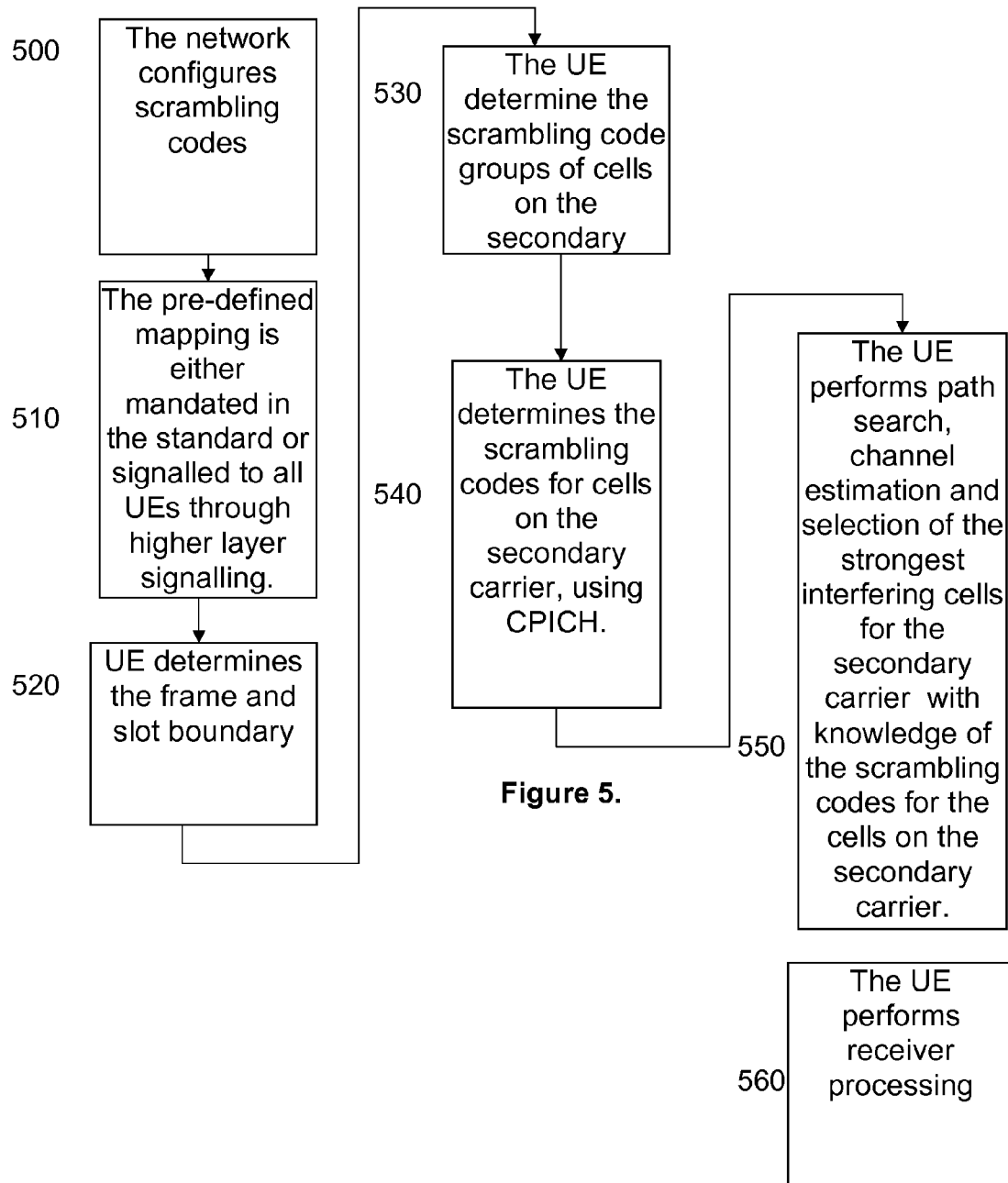

An embodiment according to this option would be similar to the above, except that an additional synch procedure is carried out in the UE. A flow chart of an embodiment according to this option is shown in FIG. 5, again assuming that higher-layer signalling is used. First in a step 500 the network configures scrambling codes with a mapping that relates the scrambling code groups on the primary carrier to the scrambling code groups on the secondary carrier with a fixed offset or some other functional relation. Next, in a step 510, the pre-defined mapping is either mandated in the standard or signalled to all UEs through higher layer signalling. Assuming that the information can be optionally signaled at periodically occuring signaling occasions, the UE re-uses the last signaled value in case the information entity was temporarily left out. Then, in a step 520, for the primary carrier, the UE determines the frame and slot boundary as well as the primary scrambling codes using the SCH. Then in a step 530, the UE makes use of the standardized or signaled relation to determine the scrambling code groups of cells on the secondary carrier. Next in a step 540, the UE determines the scrambling codes for cells on the secondary carrier, using CPICH. This is done by assuming that the slot and frame synch is the same as for the primary carrier, and using the knowledge of scrambling code groups of cells on the secondary carrier derived in the previous step. Next, in a step 550, the UE performs path search, channel estimation and selection of the strongest interfering cells for the secondary carrier with knowledge of the scrambling codes for the cells on the secondary carrier. Thereupon in a step 560, The UE performs receiver processing according to the Type 3i method or another neighbor-cell interference mitigation algorithm.

LTE:

Introduce a known mapping that defines a relation between the physical-layer cell identity, or physical layer cell-identity groups, used on primary and secondary carrier. The two options, relating the physical-layer cell identity, or relating the physical-layer cell-identity groups are described below.

Figure 6:
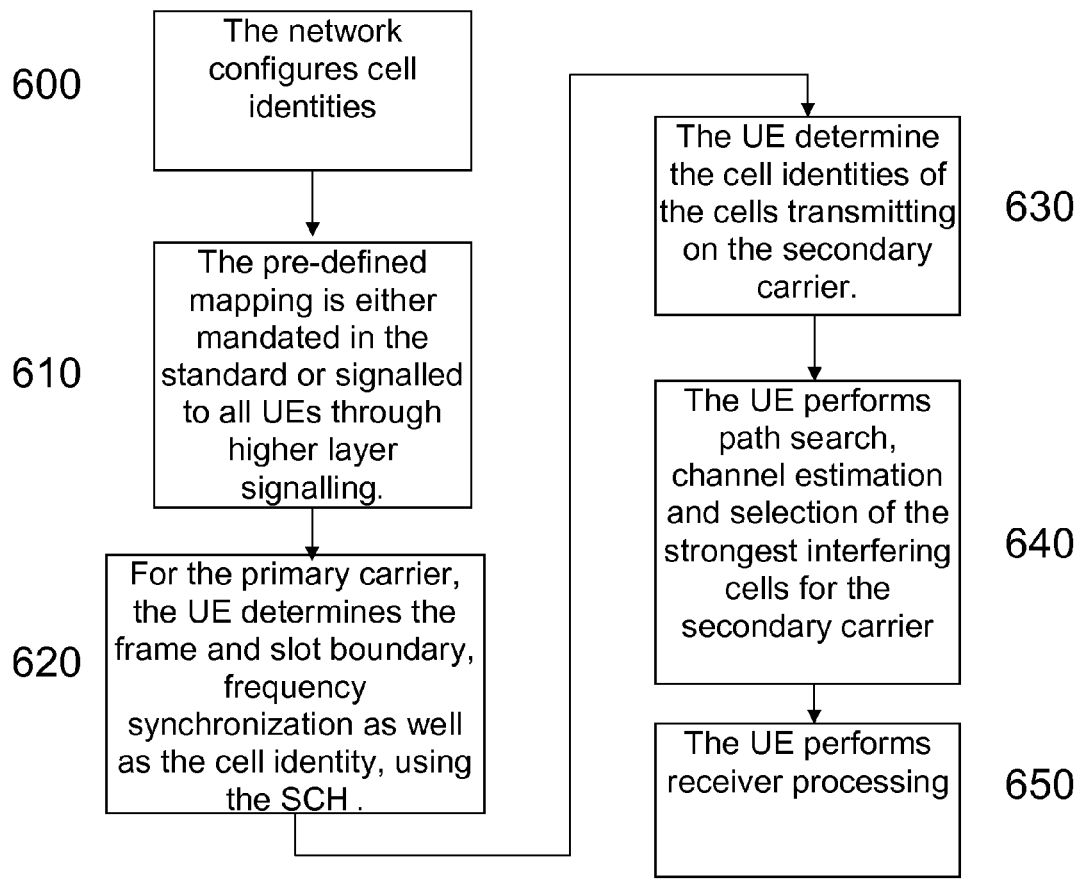

In accordance with one embodiment a mapping between physical-layer cell identities is defined. The mapping can be done through any functional relation, and is not limited to being one to one, but could also be done in a one to many fashion. The mapping could either be made known to the UE through mandating it in the standard, or through an optional or mandatory signaling of parameter(s) that determines the exact properties of the mapping. The configuration/allocation of scrambling codes in the network can be performed in a suitable node of the network such as the radio base station NodeB. An embodiment according to this option may comprise an apparatus whereby the physical-layer cell identity for the cell transmitting on the secondary frequencies is related to the physical-layer cell identity of the primary carrier by a fixed offset (or another functional relation as elaborated below). The offset (or another parameter defining the functional relation) may optionally be signaled to the UE. Assuming that the signaling occurs on a periodical basis, the UE would, in case the information entity containing the offset was optionally left out, use the stored value from the last point of receiving the information entity. A flow chart of an embodiment according to this option is shown in FIG. 6, assuming that higher-layer signalling is used.

First, in a step 600, the network configures cell identities with a mapping that relates the cell identities on the primary carrier to the cell identities on the secondary carrier through a fixed offset or another functional relation. Next in a step 610, the pre-defined mapping is either mandated in the standard or signalled to all UEs through higher layer signalling. Assuming that the information can be optionally signaled at periodically occuring signaling occasions, the UE re-uses the last signaled value in case the information entity was temporarily left out. Next, in a step 620, for the primary carrier, the UE determines the frame and slot boundary, frequency synchronization as well as the cell identity, using the SCH. Next, in a step 630, the UE makes use of the standardized or signaled relation to determine the cell identities of the cells transmitting on the secondary carrier. Next, in a step, 640, the UE performs path search, channel estimation and selection of the strongest interfering cells for the secondary carrier with knowledge of the cell identities of cells on the secondary carrier. Then, in a step 650, the UE performs receiver processing according to the Type 3i method or another neighbor-cell interference mitigation algorithm.

In accordance with one embodiment, a mapping between physical-layer cell-identity groups is defined. The mapping can be done through any functional relation, and is not limited to being one to one, but could also be done in a one to many fashion or relation. The mapping could either be made known to the UE through mandating it in the standard (i.e. pre-defined mapping), or through an optional or mandatory signaling of parameter(s) that determines the exact properties of the mapping. An embodiment according to this option would be similar to the above, with an additional step, involving correlating the reference signal received from the neighbor cell, of all physical-layer cell-identities contained in the physical-layer cell-identity group.

In different embodiments of the invention, the predefined rules or signaling can either apply to/be defined for all secondary carriers or only those secondary carriers which do not include synchronization channel. Hence in all the above embodiments, the pre-defined rules or signaling can be defined for all those secondary carriers which don't use SCH.

The use of any of these options would make it possible for the UE to identify the scrambling codes or physical-layer cell-identities used by interfering cells on the secondary carrier, without the need for the processing according to stage 1 and stage 2, as described in section 1.5. As the remaining processing (stage 3 for WCDMA, correlation of reference signals for LTE) makes use of CPICH (WCDMA) or cell specific reference symbols (LTE), this would eliminate the need to transmit SCH on the secondary carrier. Using the information of the relation between carriers on the primary and secondary frequencies, the UE can perform path search, channel estimation and interference mitigation (e.g. in enhanced receiver Type 3i processing) for the secondary carrier, without the need for SCH.

Some further elaboration for WCDMA on the different options is provided below. In WCDMA systems, each cell is transmitting with a cell-specific scrambling code. The assignment of scrambling to each cell is done through careful planning of code-reuse, based on the auto-correlation and cross-correlation properties of the different scrambling codes. Because the primary and secondary carriers are transmitted from the same physical location, it would from a network planning perspective be preferable to re-use the same scrambling code for co-located cells transmitting on adjacent frequencies or even in non-adjacent frequencies, which belong to the same or different frequency bands. However, if further consideration for practical RF-impairments such as IQ-imbalance is taken into account, there is a risk that using the same scrambling code for co-located carriers would be less preferable, since this configuration would reduce the receiver's capability to reject interference stemming from inter-carrier leakage.

Using Pre-defined rule with same scrambling code group on primary and secondary carriers or a mapping between scrambling code or scrambling code group on primary and secondary carriers would allow the primary and secondary carriers to use different scrambling codes, eliminating the issue with coherent inter-carrier leakage. However, when comparing the use of Pre-defined rule with same scrambling code group on primary and secondary carriers to mapping between scrambling code or scrambling code group on primary and secondary carriers, it can be noted that mapping between scrambling code or scrambling code group on primary and secondary carriers gives the option of eliminating the signalling completely, while still keeping the door open for over-riding the default association, and may thus be preferable from a flexibility point of view.

Considering the embodiment described above in conjunction with FIG. 4, it should be noted that although this option is the one that gives the most benefit in terms of UE complexity, it is also the option that restricts the flexibility of the network configuration the most. The embodiment as described above in conjunction with FIG. 5 requires applying the step 3 cell search processing on the secondary carrier, but this incremental complexity may be considered small.

Concerning both WCDMA and LTE, while the mapping between scrambling code or scrambling code group on primary and secondary carriers have been described using a fixed offset as the defining relation (mapping) between the primary and secondary carrier scrambling codes, but the implementation is not limited to this. Denote the primary cell SC number by N1, then the secondary cell SC number N2 may be defined via an arbitrary mapping function: N2=F(N1). (In the case of the fixed offset, we would have N2=(N1+O) mod Nsc, where O is the offset and Nsc is the number of scrambling codes or SC groups.)

The mapping may be multiple, e.g. the function F may return several values, one of which would be valid for the current NW configuration. In that case, the UE would perform additional step 3 synch procedure among the multiple SC candidates or among the SC-s belonging to the multiple SC groups. The advantage of the multiple mapping would be additional NW configuration flexibility if dynamic signaling is not employed.

In accordance with embodiments of the invention, Type 3i or other interference suppression/cancellation processing is enabled in a receiver of a UE on secondary cells in multi-carrier scenarios that do not transmit the SCH, while minimizing the need for overhead in terms of signaling of the scrambling codes for neighbouring cells.

The invention claimed is:

1. A method in a User Equipment, UE, for generating a second scrambling code group, where the UE is configured for multi carrier operation receiving downlink transmission from a Universal Mobile Telecommunications System Terrestrial Radio Access Network, UTRAN, on a set of at least two downlink carriers including an anchor carrier and at least a first secondary carrier, the method comprising the steps of:
 determining a first scrambling code group associated with a first cell on the anchor carrier; and
 deriving the second scrambling code group associated with a second cell on said first secondary carrier using a predefined rule defining the relation between the second scrambling code group and the first scrambling code group, wherein the UE is configured as having a first serving cell on the anchor carrier and a second serving cell on the first secondary carrier for reception of data from the UTRAN, and wherein the first cell is a neighbor cell to the first serving cell on the anchor carrier and the second cell is a neighbor cell to the second serving cell on the first secondary carrier.

2. The method according to claim 1, further comprising the step of:
 associating, responsive to the predefined rule, the first and the second cells with the same scrambling code group, such that the first and the second scrambling code groups are identical.

3. The method according to claim 1, further comprising the step of:
 establishing, responsive to the pre-defined rule, a pre-defined function that defines the relation between the first scrambling code group and the second scrambling code group.

4. The method according to claim 1, wherein the step of determining the first scrambling code group comprises:
 finding a slot boundary using a Primary synchronization channel, SCH, transmitted on the anchor carrier; and
 finding a frame boundary and the first scrambling code group using the Primary SCH and a Secondary SCH transmitted on the anchor carrier.

5. The method according to claim 1, wherein neither a Primary SCH nor a Secondary SCH are transmitted for the second cell on the first secondary carrier.

6. A User Equipment, UE, adapted to generate a second scrambling code group, where the UE is configured for multi carrier operation receiving downlink transmission from a Universal Mobile Telecommunications System Terrestrial Radio Access Network, UTRAN, on a set of at least two downlink carriers including an anchor carrier and at least a first secondary carrier, the UE comprising:
 a controller; and
 a memory comprising computer readable program code that when executed by the controller causes the controller to perform operations comprising:
 determining a first scrambling code group associated with a first cell on the anchor carrier; and
 deriving the second scrambling code group associated with a second cell on said first secondary carrier using a predefined rule defining the relation between the second scrambling code group and the first scrambling code group, wherein the UE is configured as having a first serving cell on the anchor carrier and a second serving cell on the first secondary carrier for reception of data from the UTRAN, and wherein the first cell is a neighbor cell to the first serving cell on the anchor carrier and the second cell is a neighbor cell to the second serving cell on the first secondary carrier.

7. The User Equipment according to claim 6, wherein the operations further comprise:
 associating, responsive to the predefined rule, the first and the second cells with the same scrambling code group, such that the first and the second scrambling code groups are identical.

8. The User Equipment according to claim 6, wherein the operations further comprise:
 establishing, responsive to the pre-defined rule, a pre-defined function that defines the relation between the scrambling code group and the scrambling code group.

9. The User Equipment according to claim 8, wherein the predefined function includes one or more parameters received from the UTRAN.

10. The User Equipment according to claim 9, wherein the one or more parameters include(s) a fixed offset between the first scrambling code group and the second scrambling code group.

11. The User Equipment according to claim 6, wherein the operation of determining the first scrambling code group comprises:
 finding a slot boundary using a Primary synchronization channel, SCH, transmitted on the anchor carrier; and
 finding a frame boundary and the first scrambling code group using the Primary SCH and a Secondary SCH transmitted on the anchor carrier, when determining the first scrambling code group.

12. The User Equipment according to claim 6, wherein neither a Primary SCH nor a Secondary SCH are transmitted for the second cell on the first secondary carrier.

* * * * *